Figure 3:
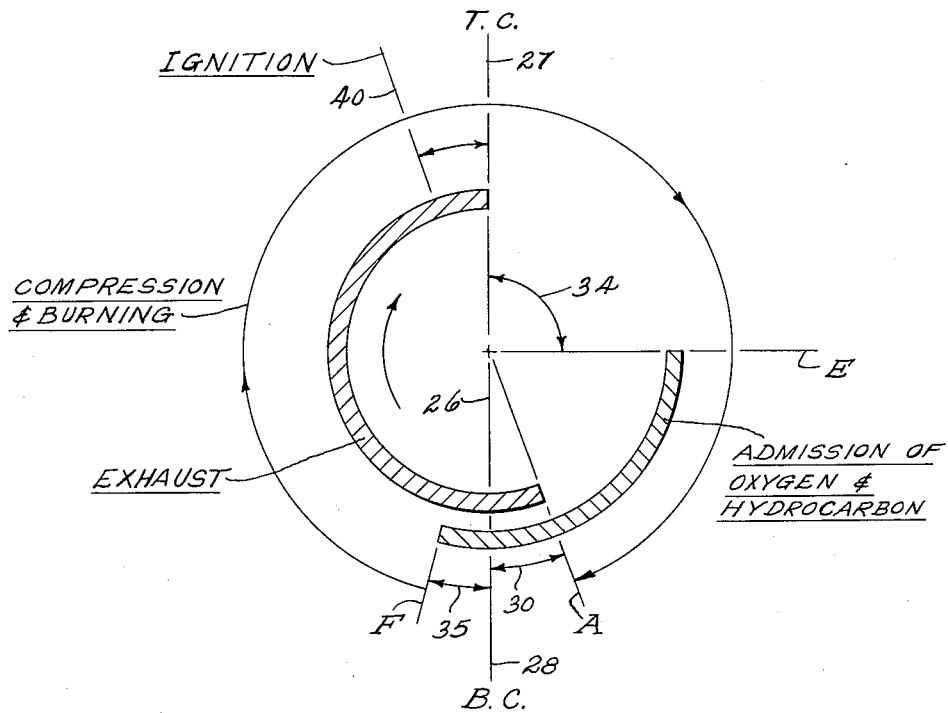

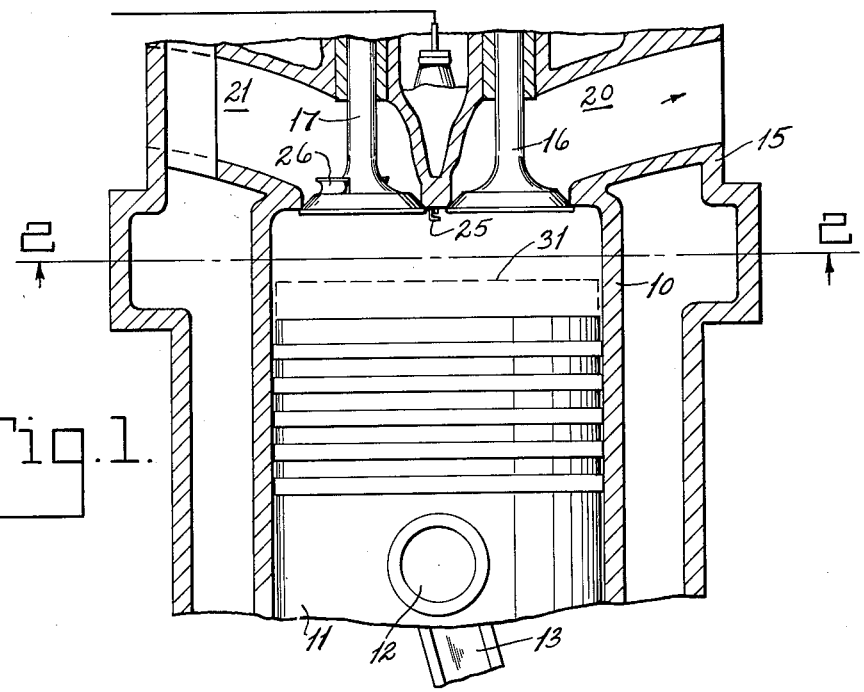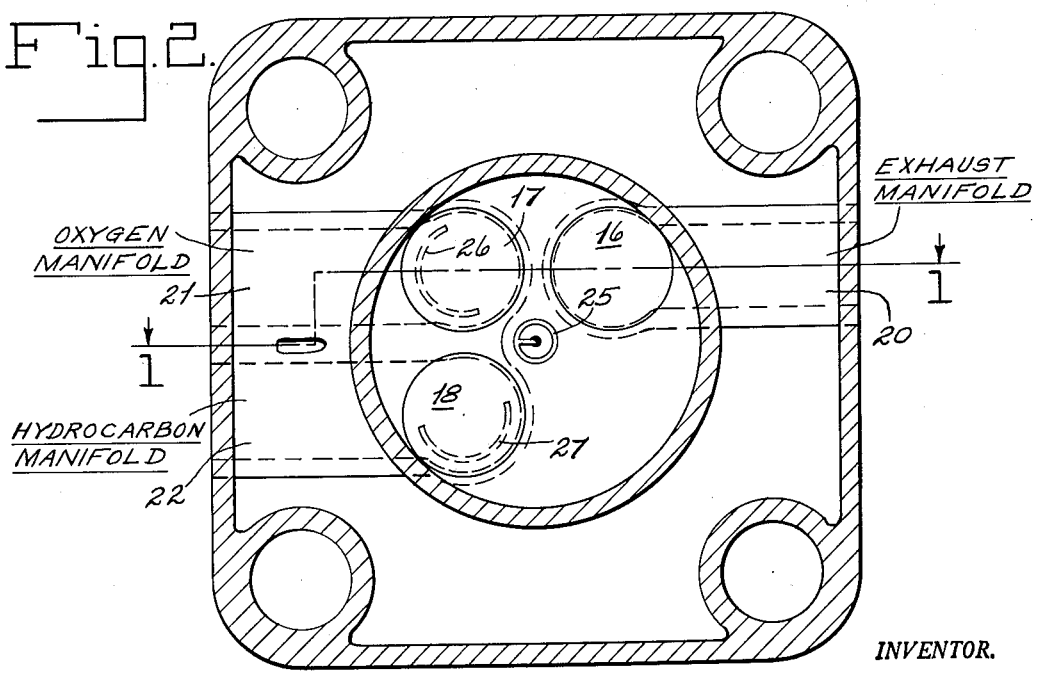

2,725,285
ENGINE GENERATION OF SYNTHESIS GAS

Jay B. Malin, Wilmington, Del., assignor to The Texas Company, New York, N. Y., a corporation of Delaware Application October 17, 1951, Serial No. 251,778

5 Claims. (Cl. 48—196)

This invention relates to the generation of hydrogen and carbon monoxide by the partial combustion of a gaseous hydrocarbon with an oxygen-containing gas in the combustion space of a cyclically operating internal combustion engine. The process of this invention is particularly useful in the generation of carbon monoxide and hydrogen by partial combustion of a hydrocarbon gas with air, enriched air, or relatively pure oxygen. The resulting products are suitable as a source of hydrogen or as feed gas for the synthesis of hydrocarbons, alcohols or ammonia.

In one of its more specific aspects, the present invention concerns the method of generating hydrogen and carbon monoxide in a four-stroke cycle internal combustion engine in which the combustion chamber is cooled after the combustion and exhaust strokes and prior to the introduction of reactants on the intake stroke by reexpansion of residual gases in the combustion chamber following exhaust of the major portion of the product gas. In accordance with this invention, the intake valve is opened on the intake stroke after the volume of the residual gases within the cylinder has been expanded to substantially more than its initial volume. In a specific embodiment of the present invention, reactants are introduced into the combustion space of a four-stroke cycle internal combustion engine during the latter portion of the intake stroke of the engine cycle, the reactants being in proper proportions for partial combustion to hydrogen and carbon monoxide. The resulting mixture of reactants is next subjected to compression after which the compressed mixture is ignited, causing it to burn. The resulting expansion of the combustion products produces the power stroke of the cycle. Following the power stroke, a major portion of the combustion products are exhausted from the cylinder during the exhaust stroke of the cycle. Throughout the process, the compression, power, and exhaust strokes are similar in purpose and in operation to those of a conventional four-stroke engine operating on the Otto cycle. The residual combustion products which remain in the combustion zone are contained therein and subjected to expansion during the first part of the normal intake stroke of the cycle, and thereafter a fresh charge of reactants is introduced for repetition of the cycle. The engine is operated continuously for the production of hydrogen and carbon monoxide as the combustion products of the engine.

The present invention contemplates separately introducing the reactants into the combustion space of the engine, following the expansion of the residual combustion products and preferably during movement of the piston away from the cylinder head. When the reactants are separately charged into the combustion zone they preferably are charged simultaneously into admixture with one another in the combustion space. Alternatively, the hydrocarbon and the oxygen-containing gas may be premixed prior to or during introduction to the combustion space of the engine.

When relatively pure oxygen is used for the generation of carbon monoxide and hydrogen in an internal combustion engine, it is desirable to introduce the oxygen and the hydrocarbon gas separately into the engine to prevent a spontaneous explosion of the reactants. This procedure, however, inevitably results in a local concentration of relatively pure oxygen in the region of the oxygen inlet valve. Admission of relatively pure oxygen during the intake portion of the cycle results in contact between the highly reactive pure oxygen and the highly combustible residual product gas. Frequently the residual gas is in the final stages of combustion and in contact with parts of the engine and with carbon deposits which are at a relatively high temperature. Under these conditions, spontaneous ignition of the mixture of oxygen and residual gas will be imminent. In general, such operations are characterized by an interruption in the nature of a backfire. In such instances, the engine loses a few cycles and then recovers and approaches regular operation, at which time the difficulty tends to recur. The net result is a continuing irregularity of operation with continuous loss in developed mechanical energy and an inferior yield and purity of the synthesis gas.

The method of the present invention overcomes the uncertain operation of a combustion engine operated on a charge of hydrocarbon and concentrated oxygen to produce carbon monoxide and hydrogen, variously described as backfiring, preignition, and precombustion which is defined as combustion which occurs during the intake stroke.

In my co-pending application, Serial No. 200,731, filed December 14, 1950, precombustion is prevented by charging steam to the combustion space during the latter portion of the period in which the products of reaction are being exhausted therefrom to purge the reaction products from the reaction space and replace them with steam. Similarly, in my co-pending application, Serial No. 198,145, filed November 29, 1950, which has issued as Patent No. 2,694,003, November 9, 1954, the combustion zone is purged with air.

In accordance with the present invention, the residual hot combustion gases remaining in the combustion zone following the usual exhaust stroke are expanded with all of the valves closed during the first part of the intake stroke while the piston is moving away from the cylinder head and prior to introduction of the charge. During this period substantial cooling of the surface of the engine parts exposed to the gases occurs due to the expansion and cooling of the residual product gases. By the time the relatively pure oxygen is subsequently admitted to the cylinder, the residual products of combustion have been cooled by this expansion to a temperature sufficiently below the flash point of the resulting mixture to prevent premature ignition of the mixture. Preferably, the residual gases are expanded during approximately the first half of the intake stroke, following which fresh reactants are charged to the cylinder. The residual gases are preferably expanded to at least one and one half times its initial volume before the intake valve is opened to introduce fresh reactants to the cylinder.

In order to more specifically disclose the present invention in greater detail, reference is made to the attached drawings wherein Figs. 1 and 2 show, respectively, vertical and horizontal views in more or less diagrammatic form of the cylinder of an internal combustion engine. Figure 3 is a diagrammatic representation of an illustrative operating cycle.

In the engine disclosed in Figures 1 and 2, which may be of a multicylinder type, an individual cylinder designated by the reference numeral 10 receives a vertically reciprocating piston 11, attached through pin 12 and connecting rod 13 to a crank shaft, not disclosed, which delivers the available mechanical energy. A cylinder head 15 is provided wherein three separate valves 16, 17, and 18 lead respectively to individual manifolds 20, 21, and 22.

In the embodiment disclosed, manifold 20 receives a product gas through exhaust valve 16. Manifolds 21 and 22 supply a stream of pure oxygen and a stream of gaseous hydrocarbon, respectively.

Ignition is effected by means of a spark plug 25 connected with electrical igniting means, not shown, and timed as will hereinafter be disclosed in greater detail.

Valves 17 and 18 are preferably shrouded as indicated at 26 and 27 with annularly disposed projections arranged to insure high turbulence and therefore complete mixing of the admitted reactants by effecting admission or injection in about the same rotational direction with reference to the axis of the cylinder. It will be understood that the exact arrangement or construction of the mixing shrouds does not, per se, form an essential part of the present invention, and accordingly, this construction is not shown in detail. It has been found that shrouds extending annularly through 90–180° of the valve are effective when faced in generally the same rotational direction. However, this construction may obviously be varied widely to secure adequate mixing and alternatively, provision of directional intake ports and/or turbulence producing cylinder head arrangements may be substituted for this purpose.

In accordance with one embodiment of the present invention, provision, not shown, is made for timing the operating of the valves and ignition means in accordance with the diagram set forth in Figure 3.

With reference to the specific example illustrated in Figure 3, progressing in a clockwise direction from the point A there is symbolized the complete cycle of operation in the case of a typical four-stroke cycle reciprocating engine. The vertical line 26 symbolizes the angular position of the engine crankshaft (not illustrated) relative to the axis of the combustion engine cylinder. Therefore, point 27 represents top dead center and point 28, bottom dead center. Accordingly, the angular segments on the right hand side of the line 26 represents the approximate intake and combustion or burning portions of the cycle, whereas the opposite side of the diagram relates, in general, to the compression and exhaust portions of the cycle.

Beginning with the exhaust portion of the cycle at the angular position A, the exhaust valve opens, preferably though not necessarily, somewhat in advance of bottom dead center, and remains open throughout approximately the entire upstroke of the piston, or exhaust stroke, as represented by the shaded area entitled "exhaust." During the exhaust stroke, the major portion of the product gas produced in a previous cycle of operation flows through outlet valve 16 into the exhaust manifold 20. In the cycle shown, the exhaust valve opens at 20° before bottom center, as indicated by the angular distance 30, and closes at top center. The position of the piston in the cylinder at top dead center is represented by the dotted line designated by numeral 31 on Figure 1.

At the position TC on the diagram, the exhaust valve closes. All of the valves remain closed until the angular position E is reached, 90° after top center, as indicated by arc 34. At 90° after top center, the hydrocarbon and oxygen valve simultaneously open at E so that the hydrocarbon and oxygen under pressure enter from manifolds 22 and 21. Admission of reactants, in the specific example selected, takes place beginning at E, 90° after top center and continuing throughout the shaded portion of the cycle, entitled "admission of oxygen and hydrocarbon," to the angular position F, preferably about or slightly after bottom center, and in this specific example 15° after bottom center as indicated by arc 35.

Following this point, with the valves closed, the engine goes through almost a complete revolution in which the mixed gases are compressed, subjected to ignition at point 40, and thereafter burned as indicated in the line designated at "compression and burning" which continues to angular position A, at which the four-stroke cycle of operation is repeated.

Since the piston does not touch the end of the cylinder at top dead center, residual product gas remains in the combustion space at the end of the exhaust stroke. As the piston begins its downward movement on the succeeding (intake) stroke, all valves remain closed thereby expanding and cooling the residual gas. This residual product gas is expanded during the downstroke of the piston on the intake stroke of the cycle to provide cooling of the residual gas and engine parts. Sufficient cooling to prevent misfiring is generally obtained by delaying the opening of the intake valves until the piston is approximately midway of the intake stroke. This corresponds to a crank position 90° from top center. It will be evident that the amount of expansion and cooling will depend to some extent upon the design of the engine. An engine having a high compression ratio, for example, will effect greater expansion and cooling of the residual gas as the piston moves through half its stroke, than will result in an engine having a low compression ratio.

It is to be understood that there is a wide permissible variation of valve and ignition timing from those disclosed in the above specific example. For example, opening of the exhaust valve usually takes place anywhere from 40° before to 40° after bottom center, but preferably, at least 10° in advance of bottom center. While the exhaust valve normally closes at about top center, it may be adjusted in accordance with engine characteristics to close from 20° in advance to 20° beyond top center. The oxygen and hydrocarbon gas inlet valves may open, for example, from about 45° to about 135° after top center and may close before, or preferably, somewhat after bottom center, as for example, 10° or even as much as 20° thereafter. The ignition point 40 depends on known principles of engine design and operations which, per se, form no part of the present invention. Therefore, spark timing is preferably adjusted for development of maximum mechanical energy with due regard to engine speed and other engine characteristics.

In a specific application of the method of this invention to the generation of carbon monoxide and hydrogen from natural gas and relatively pure oxygen, an engine having a compression ratio of 3.5 to 1 is used. The gas and oxygen are admitted to the cylinder of the engine from separate intake manifolds maintained at pressures above about 50 pounds per square inch gauge. The exhaust valve is set to close at top center and the intake valves are set to open at 90° after top center. This permits expansion of the residual gas to about 2.25 times its original volume. Calculations indicate that the residual gases are cooled from a temperature on the order of 1,500° F. to about 900° F. during the expansion. Operation in this manner results in smooth running of the engine with no spontaneous ignition.

As above indicated, the invention is especially applicable to the production of carbon monoxide and hydrogen from a normally gaseous hydrocarbon, e. g., methane and the $C_2$–$C_4$ hydrocarbons and mixtures thereof. However, the feed may consist of or include normally liquid hydrocarbons, preferably fed in a gasiform condition under a substantial preheat or injected into the cylinder.

Preheating of either or both the reactants to temperatures of 300–600° F. and higher, for example, is specifically contemplated as a means of improving thermal efficiency. The present process enables a substantial and desirable preheating of the reactants without the misfiring or preignition tendency which otherwise would accompany the introduction of relatively high temperature, substantially pure oxygen into the combustion zone.

The feed stream of oxygen is, as previously emphasized, advantageously an enriched or rectified gas composed predominantly of free oxygen. Preferably, it contains over 80 per cent and desirably over 90 to 95 per cent oxygen. As a result, the gaseous product may comprise a mixture of carbon monoxide and hydrogen substantially free from nitrogen.

The ratio of oxygen to hydrocarbon for the production of the desired product gas forms, per se, no part of the present invention, but is determined in general by the proportions indicated for partial combustion of the hydrocarbon to form maximum hydrogen and carbon monoxide. The preferred range of feed proportions to achieve these objectives may be expressed in terms of the O/C ratio of the total reactants supplied, i. e., the ratio of the number of atoms of oxygen to the number of atoms of carbon in the feed. Optimum yield for a typical engine ordinarily occurs with an O/C feed ratio of about 0.9:1 to about 1.5:1. In each instance, however, the most appropriate ratio for maximum yield depends upon the specific characteristics of the engine and is best determined by actual trial.

In the illustrated description above, the preferred valve shrouding is aligned to produce a unidirectional swirl. Intimate admixing of the reactants may be realized by arranging the valve shrouds in rotationally opposed directions so as to induce opposing swirling of the introduced reactants. Accordingly, any combination of swirling actions effective to realize the desired mixing and combustion may be used in carrying out the process of my invention.

Obviously, many modifications and variations of the invention as hereinbefore set forth may be made without departing from the spirit and scope thereof, and therefore only such limitations should be imposed as are indicated in the appended claims.

I claim:

1. In the combustion engine generation of hydrogen and carbon monoxide by the reaction of a hydrocarbon with an oxygen-containing gas containing over 80 per cent oxygen wherein said reactants are charged into the combustion space of a cyclically operating four-stroke cycle internal combustion engine in approximate relative proportions for the formation of hydrogen and carbon monoxide, compressed therein, subjected to internal combustion with the generation of mechanical energy, and the major portion of the product gas thereafter exhausted from the combustion space, the improvement which comprises subjecting the residual gaseous product remaining in the combustion space following exhaust of the major portion therefrom and prior to the introduction of reactants thereto to a volume increase at least one and one half times the volume of the combustion space at the end of the exhaust period, and thereafter charging said reactants into the combustion space during the intake stroke.

2. The method according to claim 1 wherein said hydrocarbon is a normally gaseous hydrocarbon.

3. The method according to claim 1 wherein said residual gases are expanded within said combustion space during approximately the first half of the intake stroke of said four-stroke cycle engine.

4. In the combustion engine generation of hydrogen and carbon monoxide by the reaction of a hydrocarbon with relatively pure oxygen wherein said reactants are separately charged into the combustion space of a cyclically operating four-stroke cycle internal combustion engine in approximate relative proportions for the formation of hydrogen and carbon monoxide, compressed therein, subjected to internal combustion with the generation of mechanical energy, and the major portion of the product gas thereafter exhausted from the combustion space, the improvement which comprises subjecting the residual product gas remaining in the combustion space following the period in which the products of reaction are exhausted therefrom and prior to the introduction of the reactants thereto to a volume increase at least one and one half times the volume occupied by the residual product gas at the end of said exhaust period, thereby effecting cooling of the combustion space following the exhaust and prior to the introduction of the reactants thereto, and thereafter charging said reactants into the combustion space while increasing the volume of said combustion space.

5. The method according to claim 4 wherein said hydrocarbon is a gasiform hydrocarbon and said gasiform hydrocarbon and oxygen are separately and simultaneously introduced into the combustion space of the engine.

References Cited in the file of this patent

UNITED STATES PATENTS

| | | |
|---|---|---|
| 1,107,581 | Brownlee et al. | Aug. 18, 1914 |
| 1,356,730 | Mowbray | Oct. 26, 1920 |
| 1,680,505 | De Latour | Aug. 14, 1928 |
| 1,687,082 | Cole | Oct. 9, 1928 |
| 2,484,249 | Ruble | Oct. 11, 1949 |
| 2,543,791 | Malin | Mar. 6, 1951 |